United States Patent [19]

Habermann et al.

[11] 4,121,143
[45] Oct. 17, 1978

[54] DEVICE FOR COMPENSATING SYNCHRONOUS DISTURBANCES IN THE MAGNETIC SUSPENSION OF A ROTOR

[75] Inventors: Helmut Habermann; Maurice Brunet; Pierre Joly, all of Vernon, France

[73] Assignee: Societe Anonyme dite: Societe Europeene de Propulsion, Puteaux, France

[21] Appl. No.: 751,941

[22] Filed: Dec. 17, 1976

[30] Foreign Application Priority Data

Dec. 24, 1975 [FR] France .................. 75 39759

[51] Int. Cl.$^2$ .................................. G05B 11/01
[52] U.S. Cl. .................. 318/629; 74/5.6 D; 308/10
[58] Field of Search .............. 318/629, 632, 661; 308/10; 74/5.6 D; 328/166, 167

[56] References Cited

U.S. PATENT DOCUMENTS

| | | | |
|---|---|---|---|
| 3,359,805 | 12/1967 | Schlitt .................. | 74/5.6 D |
| 3,787,100 | 1/1974 | Habermann et al. .................. | 308/10 |
| 3,902,374 | 9/1975 | Hoffman et al. .................. | 308/10 |
| 3,937,533 | 2/1976 | Veillette .................. | 308/10 |

Primary Examiner—David Smith, Jr.
Attorney, Agent, or Firm—Lewis H. Eslinger

[57] ABSTRACT

A device is disclosed for compensating synchronous disturbances in the magnetic suspension system of a rotor which is supported by a radial electromagnetic bearing and which has means associated therewith for detecting the radial position of the rotor, comprising a servo-circuit for connection between the detecting means and windings of the electromagnetic bearing and including a circuit for the control of the current supply to the windings in response to signals from the detecting means to keep the rotor in a pre-determined radial position. The servo-circuit is provided with means for filtering the signals supplied by the detecting means between the latter and the control circuit, the filtering means having at least one band rejection filter centered on a frequency which is a direct function of the speed of rotation of the rotor.

6 Claims, 8 Drawing Figures

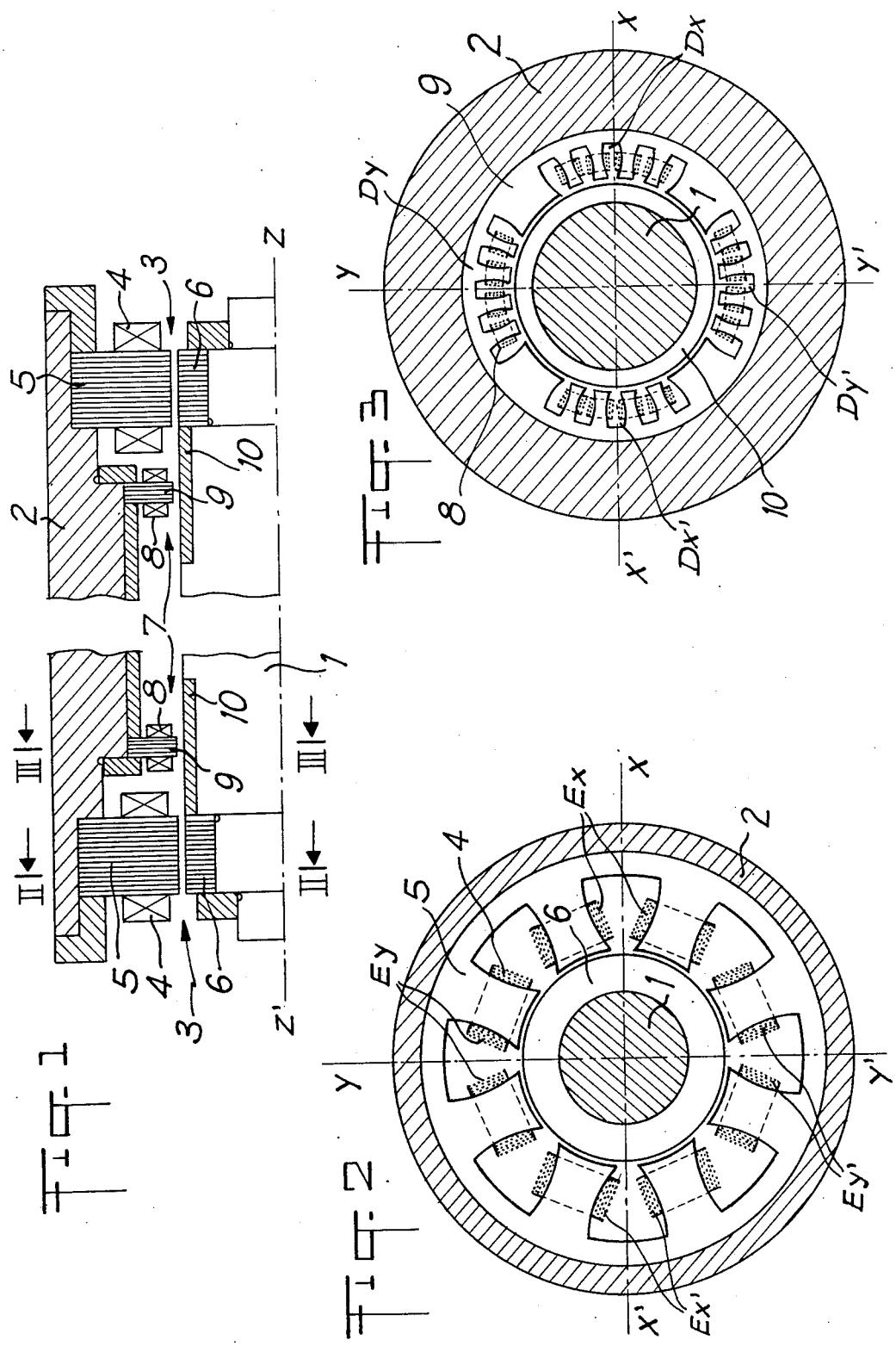

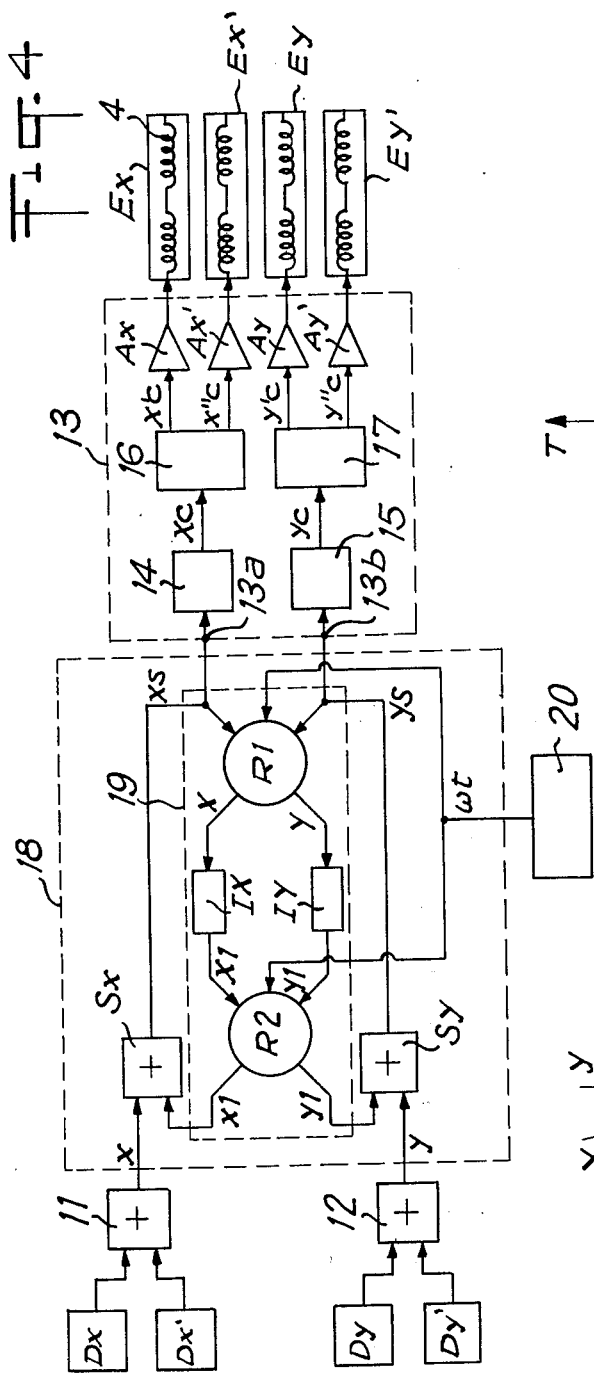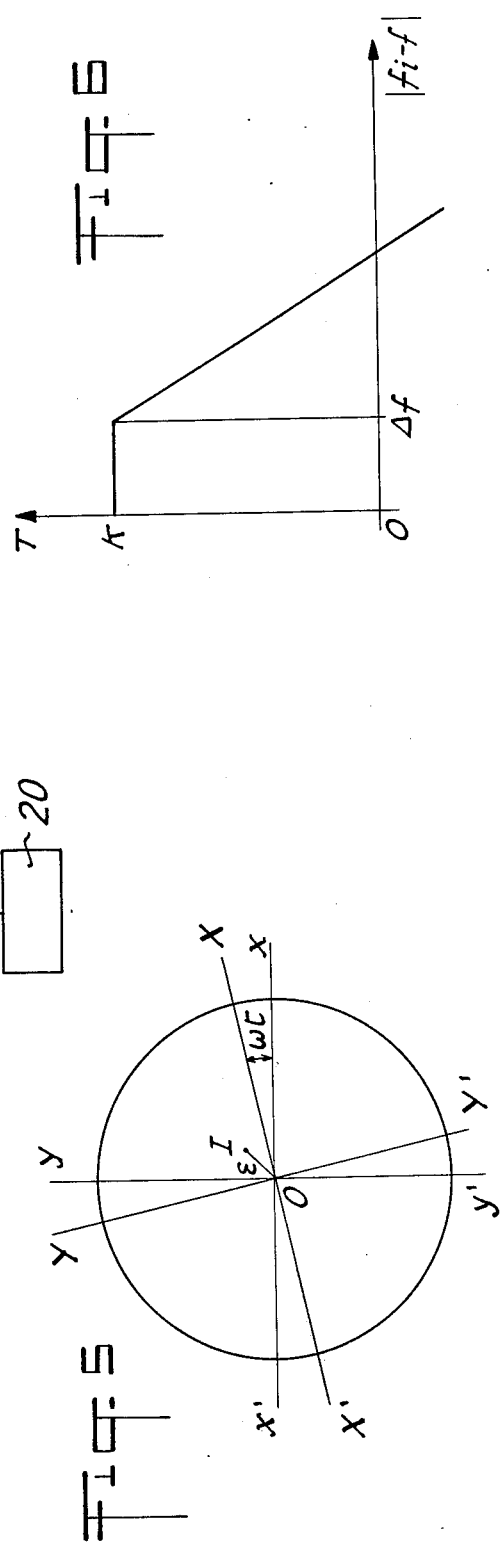

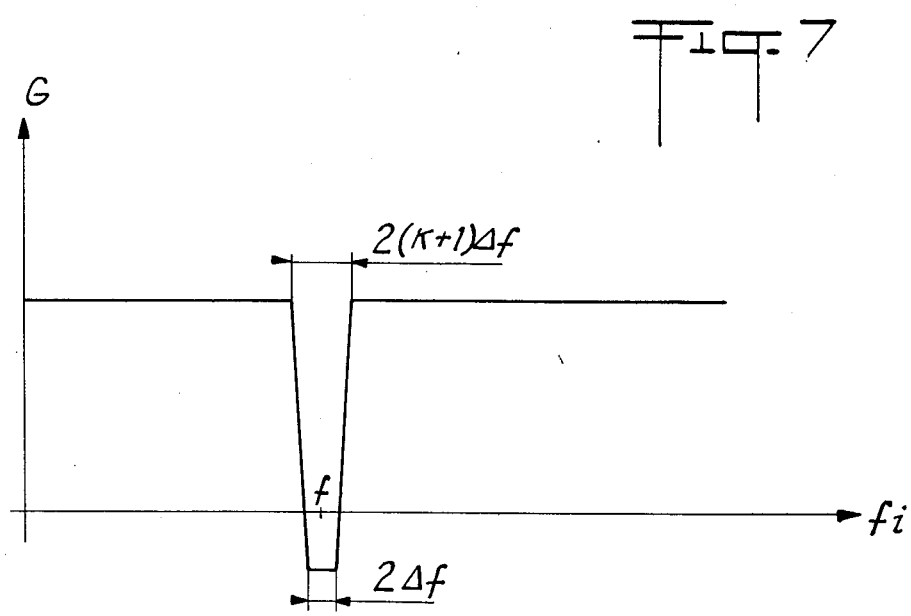
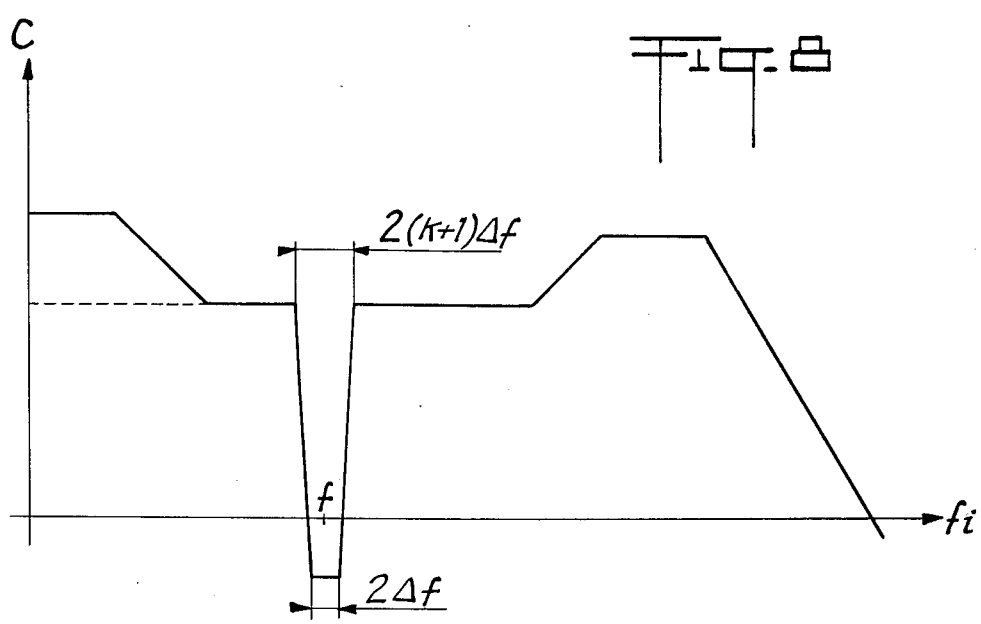

DEVICE FOR COMPENSATING SYNCHRONOUS DISTURBANCES IN THE MAGNETIC SUSPENSION OF A ROTOR

The present invention relates to a device for compensating synchronous disturbances in the magnetic suspension system of a rotor. It is concerned with a suspension system having at least one radial electromagnetic bearing which has means associated therewith for detecting the radial position of the rotor. A servo-circuit is connected between the detecting means and windings of the electromagnetic bearing and includes a circuit controlling the current supply to those windings. It acts in response to signals supplied by the detecting means to keep the rotor in a predetermined radial position.

In any suspension system, whether it is mechanical, with hydraulically or pneumatically lubricated bearings, or whether it is magnetic, the problem arises of balancing the suspended rotor. It is impossible to machine and mount a rotor in bearings in such a manner that its axis of inertia coincides exactly with the axis of rotation defined by the bearings. This non-coincidence results in unbalance.

In a mechanical suspension system, the existence of this unbalance results, when the rotor rotates, in alternating forces being transmitted by the bearings, giving rise to undesirable vibrations of the stator. To limit the amplitude of these vibrations, elaborate balancing the rotor for its rated speed is generally carried out. This is achieved by means of additional masses distributed over the rotor in such a manner as to make its axis of inertia coincide with the axis of rotation defined by the bearings. This manner of balancing requires high precision and great delicacy. Moreover, it cannot compensate for later variations due for example to ageing or to deformations of thermal origin. Also, this balancing, when it is performed for a given rated speed of rotation, cannot compensate for variations which may arise when the rotor is driven at a speed other than its rated speed.

With electromagnetic suspension system the existence of any unbalance results in a tendency of the rotor to rotate about an axis, its axis of inertia, distinct from the predetermined axis of rotation defined by the bearing. But, it can be arranged that, as soon as the actual axis of rotation of the rotor departs from its pre-determined position, a detection device emits an error signal which is transmitted to the windings of the bearing in such a form as to bring the axis of rotation back to the predetermined position. The problem of balancing the rotor is to some extent answered, but it is often still necessary to provide additional masses as described above and the same drawbacks as those already mentioned remain.

It is therefore an object of the present invention to provide a device for reducing considerably, or even cancelling, in a magnetic suspension system for a rotor the harmful effects due to stray disturbances. These generally have their origin in the existence of some unbalance and result in the transmission by the detection system of alternating error signals with a frequency equal to the angular speed of rotation of the rotor. But there exist other types of stray disturbances synchronous with the rotation. These may, for example, have their origin in defects of symmetry of the rotary or static elements of a motor driving the rotor carried by the magnetic suspension system. All these synchronous disturbances are of an alternating nature, and their frequency is related to the speed of rotation of the rotor, that is to say a frequency that is equal to, or is a multiple of, that angular velocity. Thus, the present invention aims also to combat the effects due to any synchronous disturbances, such as may originate in defects of geometrical or magnetic symmetry of the rotor, or of the position detectors, or of the bearings, or even of an electric motor driving the rotor.

According to the present invention there is provided a device for compensating synchronous disturbances in the magnetic suspension system of a rotor which is supported by a radial electromagnetic bearing and which has means associated therewith for detecting the radial position of the rotor, comprising a servo-circuit for connection between the detecting means and windings of the electromagnetic bearing and including a circuit for the control of the current supply to the windings in response to signals from the detecting means to keep the rotor in a pre-determined radial position, the servo-circuit having means for filtering the signals supplied by the detecting means between the latter and the control circuit, with at least one band rejection filter centered on a frequency which is a direct function of the speed of rotation of the rotor.

The band rejection filter is centered on a frequency equal to the speed of rotation of the rotor so that the disturbances due to any unbalance and due to the detector are not transmitted to the control circuit. For these disturbances, the rigidity of the bearing is considerably reduced, and the rotor is therefore free to rotate about its axis of inertia. Thus, whereas with the method of balancing by means of additional masses an attempt is made to ensure that the axis of inertia of the rotor should correspond with the axis of rotation defined by the bearing, there is performed, in accordance with this invention, a "balancing" of the rotor by causing or allowing its axis of rotation to coincide with its axis of inertia. This occurs whatever the variations in the unbalance might be.

In a preferred form, means are provided for slaving the central frequency of the band rejection filter to the rotational speed of the rotor.

In more detail, the device may include first and second means for connection to the detecting means and adapted to supply respectively first and second input signals representing the radial position of the rotor respectively according to first and second axes of reference, these axes being fixed and perpendicular to each other and to a pre-determined axis of rotation of the rotor. The control circuit will have first and second inputs connected respectively to the first and second input supply means. In this case the filtering means will advantageously comprise first and second two-input adders having their first inputs connected to said first and second input signal supply means respectively, and their outputs, which produce first and second output signals, to the first and second inputs respectively of the control circuit, and a counter-reaction circuit connected between the outputs of the adders and their second inputs; this counter-reaction circuit comprising a first conversion circuit of the type able to perform a conversion of co-ordinates of the fixed reference system provided by said fixed axes into a rotating reference system constituted by two axes perpendicular to each other and to the axis of rotation of the rotor and which rotates in relation to the fixed reference system at a speed equal to said control frequency of the band rejection filter, this first conversion circuit having two inputs connected with the outputs of said adders to receive said first and second output signals and convert them into third and fourth signals, a first integrator connected with the first conversion circuit to receive said third signal and integrate it, a second integrator connected with the first conversion circuit to receive said fourth signal and integrate it, a second conversion circuit of the type able to perform a conversion of coordinates of said rotating reference system into said fixed reference system, said second conversion circuit having two inputs connected respectively to the first and second integrators to convert the signals supplied by said integrators into fifth and sixth signals, the second inputs of the first and second adders being connected to said conversion circuit to receive respectively said fifth and sixth signals.

Generally a tachometric converter circuit will be used for supplying a signal representative of the speed of rotation of the rotor and this will be connected to the first and second conversion circuits.

The integretor may have a narrow pass band limited to low frequencies below 1 Hz. The central frequencies of the band rejection filter may be equal to or an integral multiple of the speed of rotation of the rotor.

This counter-reaction circuit provides a band rejection filter with a frequency constantly and automatically slaved to the speed of rotation of the rotor. With any unbalance, automatic balancing is carried out whatever the variations of the unbalance may be and for any speed of rotation of the rotor.

For a better understanding of the invention one embodiment thereof will now be described, by way of example, with reference to the accompanying drawings in which:

FIG. 1 is a half axial section of a rotor mounted in radial magnetic bearings;

FIG. 2 is a full radial section on the line II—II of FIG. 1;

FIG. 3 is a full-radial section on the line III—III of FIG. 1;

FIG. 4 is a diagram of a servo-circuit of a device in accordance with the invention;

FIG. 5 is a representation of the rotating system constituted by the rotor;

FIG. 6 is a graph of the transfer function of a counter-reaction circuit shown in FIG. 4;

FIG. 7 is a graph of the overall transfer function of a processing circuit shown in FIG. 4, and FIG. 8 is a graph representing the rigidity of the bearing as a function of the frequency of the disturbances to which the rotor is subjected.

FIGS. 1 to 3 show a rotor 1 supported in a stator 2 by means of two radial magnetic bearings 3. Each bearing is an electro-magnet with eight windings 4 mounted on poles of a fixed armature 5. These co-operate with a ring armature 6 fixed to and coaxial with the rotor 1.

The windings are arranged as two sets of opposed pairs E$x$, E$x'$ and E$y$, E$y'$ associated with two fixed orthogonal diametral axes X'X and Y'Y respectively. These reference axes are perpendicular to the predetermined rotational axis Z'Z defined by the bearing. The pairs of a set, for example E$x$ and E$x'$, are diametrically opposed and each exerts an attraction on the rotor when their windings are energised. In the example illustrated, each pair of windings 4 is connected in series.

Each bearing has associated with it a radial detection device 7 with two pairs of detectors D$x$, D$x'$ and D$y$, D$y'$ disposed on two fixed axes respectively parallel to X'X and Y'Y. The two detectors of one and the same pair are diametrically opposed. In the example illustrated, each detector is constituted by several windings 8 mounted on a fixed armature 9 co-operating with a ring armature 10 fixed to and coaxial with the rotor 1. Other types of detector may be used, in particular detectors of the capacitive or optical type.

The rotor 1 may be driven by means of an electric motor (not shown) having its stator fixed with respect to the stator 2 and its rotor fixed with respect to the rotor 1.

It is known to slave each bearing from the signals of the detectors by means of a circuit comprising adders such as 11 and 12 (FIG. 4) which summate the signals of each pair of detectors and deliver at their respective outputs signals $x$ and $y$ representative of the gap between the actual and predetermined radial positions of the axis of rotation of the rotor, respectively along axes X'X and Y'Y.

In a known servo-circuit the signals $x$ and $y$ are applied respectively to the inputs 13$a$ and 13$b$ of a control circuit 13 which governs the electro-magnets E$x$, E$x'$, E$y$ and E$y'$. Such a control circuit comprises—in the example shown, phase advance networks 14, 15 which supply control signals $x_c$, $y_c$. These control signals are dephased by means of phase converters 16, 17 to produce signals $x'c$, $x''c$ and $y'c$, $y''c$ which, when amplified by means of amplifiers A$x$, A$c'$, A$y$, A$y'$, are fed to the electro-magnets E$x$, E$x'$, E$y$ and E$y'$ with the suitable polarity. Several such control circuits are known; see for example French Pat. No. 2,149,644.

In this compensation system, a further circuit is inserted between the outputs of the adders 11 and 12 and the inputs 13$a$ and 13$b$ of the control circuit 13. This is a processing circuit 18 which reduces or eliminates the transmission of stray disturbances to the control circuit.

When the rotor 1 is unbalanced, there is a diametrical departure $\epsilon$ between its pre-determined rotational axis O and its axis of inertia I (FIG. 5). However small this may be, it results in the transmission, through the detectors, of stray alternating error signals whose frequency of variation, in Hz, is equal to the speed of rotation of the rotor expressed in revolutions per second.

The circuit 18 of FIG. 4 filters out these stray error signals generated by the unbalance of the rotor 1.

The circuit 18 comprises two adders S$x$ and S$y$, each with two inputs. Their first inputs are connected respectively with the outputs of the adders 11 and 12 and thus receive respectively the signals $x$ and $y$. The outputs of the adders S$x$ and S$y$ are connected respectively to the inputs 13$a$ and 13$b$ of the control circuit 13, and supply respectively signals $x_s$ and $y_s$. A counter-reaction circuit 19 is connected between the outputs of the adders S$x$ and S$y$ and their second inputs.

The counter-reaction circuit 19 comprises a first conversion circuit or resolver R1 receiving at first and second inputs signals $x_s$ and $y_s$ respectively and supplying at its two outputs signals X and Y respectively such that:

$$\begin{cases} X = x_s \cos\omega t + y_s \sin\omega t \\ Y = -x_s \sin\omega t + y_s \cos\omega t \end{cases}$$

$\omega$ being equal to the angular speed of the rotor, and $t$ representing time.

Considering $x_s$ and $y_s$ to be the coordinates of a point in a fixed reference system with axes $x'x$ and $y'y$, X and Y will represent the coordinates of this point in a rotating reference system with orthogonal axes X'X and Y'Y (FIG. 5). These axes will be perpendicular to the axis of rotation of the rotor, intersect on that axis, and be fixed with respect to the rotor. Any unbalance generates stray error signals having a frequency equal to the speed of rotation of the rotor, as mentioned above, and the conversion effected by the resolver R1 effectively makes the unbalance fixed relative to the rotor. This can be used to compensate the departure $\epsilon$.

For this to be achieved, the signals X and Y are integrated in the rotating reference system by means of integrators IX and IY respectively. Any unbalance being fixed or very slowly variable, it will be possible to limit the pass band of integrators IX and IY to low or even very low frequencies. The signals $X_1$ and $Y_1$ supplied by the integrators IX and IY are applied to first and second inputs of a second conversion circuit, or resolver, R2 which effects a conversion reverse to that of the resolver R1 and which supplies at its two outputs signals $x_I$ and $y_I$. These are applied to the second inputs of the adders Sx and Sy respectively.

Signals $x_I$ and $y_I$ are returned to the adders with a polarity opposed to that of signals $x_s$ and $y_s$ and we have:

$$\begin{cases} x_1 = - [X_1 \cos\omega t - Y_1 \sin\omega t] \\ y_1 = - [X_1 \sin\omega t + Y_1 \cos\omega t] \end{cases} \text{ and } \begin{cases} x_s = x + x_I \\ y_s = y + y_I \end{cases}$$

Therefore the effect is as if a superimposition was made on signals x and y of compensation signals representing a fictitious unbalance balancing the real unbalance.

Resolvers $R_1$ and $R_2$ each receive at a third input a signal $\omega t$ supplied by a tachometric converter circuit 20 which processes a magnitude proportional to the actual rotation speed of the rotor. These resolver circuits R1 and R2 convert data between a fixed reference system and a rotating reference system, and may be of known construction. In particular, the circuit 19 may be a numerical circuit, signals x and y being converted into numerical form before being applied to the circuit 19 and the signals $x_s$ and $y_s$ being converted to analog form before being applied to the control circuit 13. With regard to the reversal of the signals which are returned to the adders and summated to the signals x and y, this may be carried out by inversion of the signals at any point in the counter-reaction circuit 19.

Assuming that $fi$ denotes the frequency of the signal $x_s$ and $f$ the speed of the rotor in revolutions per second, the transfer function T of the counter-reaction circuit 19 varies as illustrated in the asymptotic representation of FIG. 6. $\Delta f$ represents the pass band of the integrators IX and IY and K the amplification of these integrators. We have:

$$T = \frac{K}{1 + \frac{P}{\Delta\omega}}$$

with $P = j|\omega_i - \omega| = 2\pi j |fi - f|$ and $\Delta\omega = 2\pi\Delta f$ Signals $x_I$ and $y_I$ being reinjected with a sign opposite to that of signals $x_s$ and $y_s$, the transfer function G of the entirety of the circuit 18 can be expressed as:
$G = 1/(1 + T)$ and is illustrated in the asymptotic representation of FIG. 7. Circuit 18 therefore constitutes for signals x and y a band rejection filter with a narrow frequency band centered on a frequency always equal to the speed of rotation of the rotor. As represented in FIG. 7, the gain is divided by a factor (K + 1) in a frequency band whose width decreases, with the gain, by a value equal to 2 (K + 1) $\Delta f$ down to a value 2 $\Delta f$.

The rigidity C of the bearing is represented in FIG. 8. The presence of the circuit 18 causes a sudden drop of the rigidity in a frequency band centered on the frequency $f$. For any synchronous disturbance, i.e., of a frequency equal to the speed of rotation, the rigidity of the bearing is eliminated and the rotor rotates freely about its axis of inertia. As already mentioned, the unbalance associated with the rotor is generally constant or slowly variable and it will be possible to limit the pass band of the integrators to the very low frequencies, for example below 1 Hz and even to 0.1 Hz in order to cancel the rigidity of the bearing substantially exclusively for synchronous disturbances.

From the asymptotic curve of FIG. 8 it will be seen that rigidity C is, for frequency $f$, substantially divided by (K + 1). Advantageously, provision is made for the integrators IX and IY to be amplifiers with variable gain so as to be able to adjust the value K. Moreover, in order to prevent the rigidity of the bearing being nil when the rotor starts, cut-out means are provided permitting the activation of the counter-reaction circuit 18 only after the rotor has started. These cut-out means may include a switch mounted in series in circuit 18. Also, before the rotor has started, it is possible to keep the gain K of the amplifiers at a nil value by means of a regulator element.

The device described above is suitable for the elimination of all synchronous stray disturbances, particularly those due to the existence of unbalance.

But, as already indicated, other types of stray disturbances connected with the speed of rotation of the rotor may exist. These disturbances, due for example to defects of symmetry of the position detectors or to defects of construction of the driving motor, which might for example have a slightly elliptical shaped stator or rotor, give rise to cyclic stray error signals from the detectors.

Such stray disturbances may be broken down into harmonics of a base frequency equal to the speed of rotation of the motor. The even harmonics are eliminated as a result of the arrangement of the detectors in diametrically opposed pairs, but the odd harmonics result in the transmission of stray error signals at an odd multiple frequency of the base frequency.

The device of FIG. 4 compensates for these stray signals by supplying to the resolvers R1 and R2 a signal representative of $n\omega t$, n being the order of harmonic of the base frequency for which a filtering of the signals from the detectors is desired. This signal representation of $n\omega t$ may be simply obtained through multiplications of the signal supplied by the converter 20. The resolver R1 then converts coordinates of the fixed reference system ($x'x$, $y'y$) into those of a reference system rotating relative to said fixed reference system with an angular speed $n\omega$. The resolver R2 performs the reverse conversion.

Various modifications and additions to the system are envisaged. In particular, it will be possible to use several processing circuits such as 18, each associated with a particular frequency. Finally, it will be noted that the device, although it has been described for a single radial detection system, can also be associated with each radial detection system provided in the rotor suspension device.

What we claim is:

1. A magnetic suspension system for a rotor, comprising at least one active radial electromagnetic bearing having electromagnetic windings; detecting means for producing a position signal representative of the radial position of the rotor with respect to a predetermined radial position; energizing means for supplying current to said windings; and a servo-circuit coupled between said detecting means and said energizing means for controlling the current supplied to said windings in response to said position signal so as to maintain the rotor in said predetermined radial position, wherein said servo-circuit comprises:

band rejection filter means receiving said position signal and having a frequency rejection band centered on a central frequency equal to $n\cdot\omega$, where $n$ is an integer and $\omega$ is the rotational speed of the rotor, for eliminating from said position signal a component having the frequency $n\cdot\omega$, and means for generating a signal representative of the rotational speed $\omega$ of the rotor and connected to said band rejection filter means for continuously slaving said central frequency of said frequency rejection band to the value $n\cdot\omega$.

2. A magnetic suspension system for a rotor, comprising at least one active radial electromagnetic bearing having electromagnetic windings; first and second detecting means for producing first and second signals representative of the radial position of the rotor according to first and second axes perpendicular to each other and to the axis of rotation of the rotor in a fixed reference system; energizing means for supplying a current to said windings; and a servo-circuit connected between said first and second detecting means and said energizing means for controlling the current supplied to said windings in response to said first and second signals so as to maintain the rotor in a predetermined radial position, wherein said servo-circuit comprises:

band rejection filter means receiving said first and second signals and having a frequency rejection band centered on a central frequency equal to $n\cdot\omega$, where $n$ is an integer and $\omega$ is the rotational speed of the rotor, for eliminating from said first and second signals components having the frequency $n\cdot\omega$; and means for generating a signal representative of the rotational speed $\omega$ of the rotor and connected to said band rejection filter means for continuously slaving said central frequency of said frequency rejection band to the value $n\cdot\omega$.

3. A magnetic suspension system as claimed in claim 2, wherein said band rejection filter means comprises a first two-input adder having a first input connected to said first detecting means for receiving said first signal and an output connected to said energizing means;

a second two-input adder having a first input connected to said second detecting means for receiving said second signal and an output connected to said energizing means;

a first conversion circuit for performing a coordinate conversion from said fixed reference system to a rotating reference system constituted by two axes which are perpendicular to each other and to the axis of rotation of the rotor and which rotate with respect to the fixed reference system at a speed equal to $n\cdot\omega$, said first conversion circuit having first and second inputs connected to the outputs of said first and second adders, respectively, to receive the output signals thereof for converting said output signals into third and fourth signals;

a first integrator connected to said first conversion circuit to receive and integrate said third signal;

a second integrator connected to said first conversion circuit to receive and integrate said fourth signal; and a second conversion circuit for performing a coordinate conversion from said rotating reference system to said fixed reference system, said second conversion circuit having first and second inputs connected to said first and second integrators to receive the integrated signals supplied thereby and convert said integrated signals into fifth and sixth signals, said first and second adders having second inputs connected to said second conversion circuit to receive said fifth and sixth signals, respectively.

4. A magnetic suspension system as claimed in claim 3, wherein said first and second conversion circuits are resolver circuits, and wherein a tachometric generator is provided for delivering to said conversion circuits a signal representative of the rotating speed of the rotor.

5. A magnetic suspension system as claimed in claim 3, wherein each of said first and second integrators has a narrow pass band limited to low frequencies below 1 Hz.

6. A magnetic suspension system as claimed in claim 2, wherein said central frequency is equal to the rotational speed of the rotor.

* * * * *